Sept. 2, 1952   H. CONVISER   2,609,512
FREQUENCY METER

Filed Oct. 30, 1946   3 Sheets-Sheet 1

INVENTOR
HARRY CONVISER
BY
ATTORNEY

Sept. 2, 1952   H. CONVISER   2,609,512
FREQUENCY METER
Filed Oct. 30, 1946   3 Sheets-Sheet 2

INVENTOR
HARRY CONVISER
BY Anton J Nille
ATTORNEY

Sept. 2, 1952
H. CONVISER
2,609,512
FREQUENCY METER
Filed Oct. 30, 1946
3 Sheets-Sheet 3
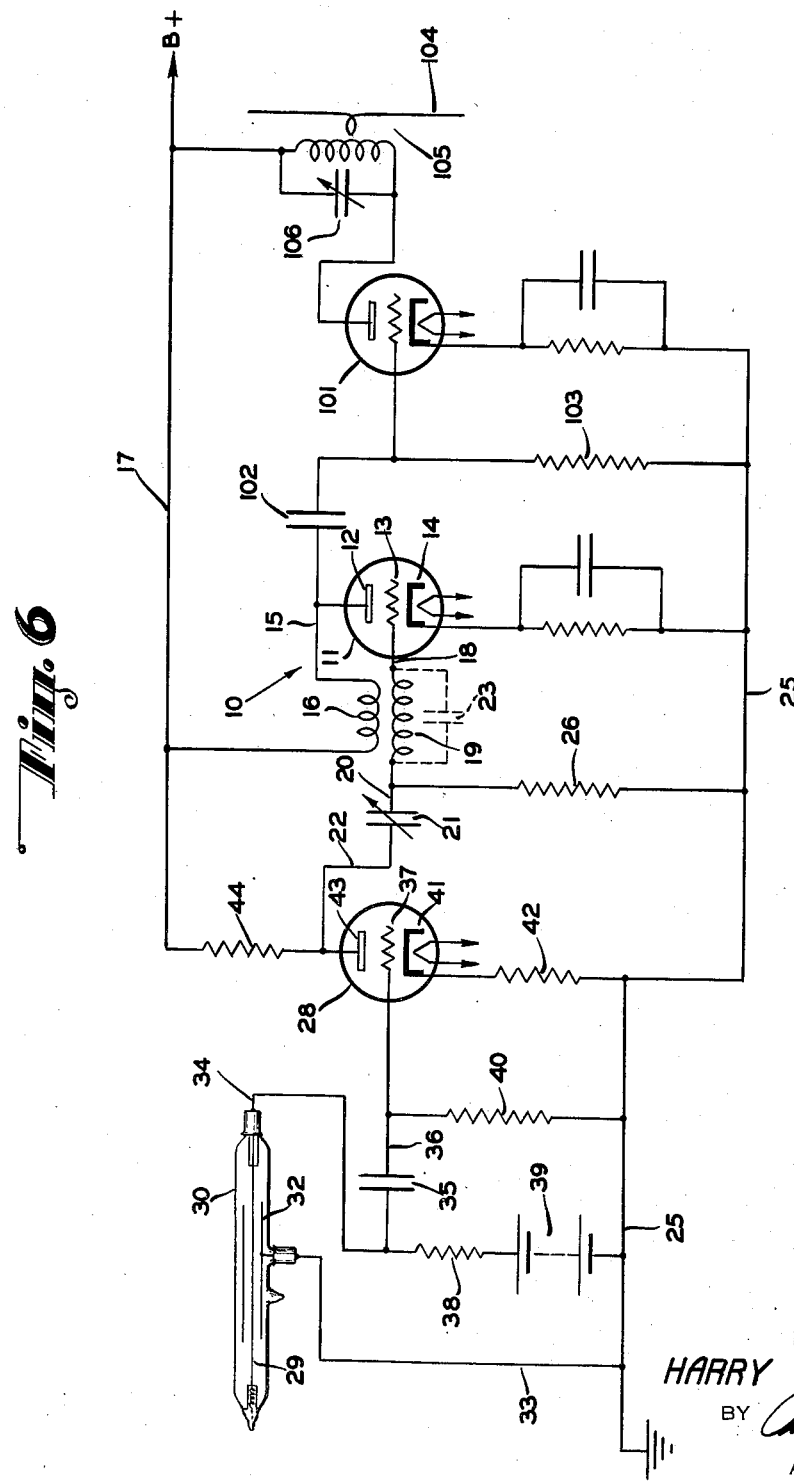
INVENTOR
HARRY CONVISER
BY
ATTORNEY Patented Sept. 2, 1952

2,609,512

UNITED STATES PATENT OFFICE 2,609,512

FREQUENCY METER

Harry Conviser, Ardsley, N. Y., assignor to Bendix Aviation Corporation, Teterboro, N. J., a corporation of Delaware Application October 30, 1946, Serial No. 706,743

15 Claims. (Cl. 250—83.6)

This invention relates to a frequency meter and more particularly to a meter useful in obtaining average readings of a succession of periodic impulses, or of aperiodic electrical impulses such as may be obtained from a Geiger-Mueller tube detecting radioactive rays, and the like.

The detection of elementary atomic particles by means of a Geiger-Mueller tube manifests itself in ionization of the gas or gases within the tube. Whether the tube used is of the self-quenching type, or is provided with a quenching circuit, the current in the anode circuit is of transient character. Due to the random nature of radioactive rays and due in part to the detecting phenomenon of the Geiger-Mueller tube the transient impulses developed by the tube may be non-uniform as to amplitude and width (time). The counting of the rate of occurrence of such impulses is beset with difficulty due to their aperiodicity.

Methods employed in counting rate meters have used successive stages of clipping and limiting ampifiers to shape the pulses delivered by a radioactivity detector, to have constant amplitude and constant pulse width. Other methods employed triggering circuits for obtaining uniform pulses. The resultant wave forms of positive sign were then applied to the grid of a tube normally biased to cut-off, the plate current surges being then applied to a metering circuit having a large time constant. Such methods require extremely sensitive meters and the use of electrolytic condensers.

My present invention has for an object a highly improved and efficient meter for use in the measurement of pulse frequency.

Another object of my invention is to provide a frequency meter with an externally blocked oscillator which performs the functions of clipping, limiting and equalizing aperiodic or periodic impulses impressed thereon.

A further object of this invention is to provide a pulse-measuring circuit including a blocking oscillator, the output of which is substantially independent of pulse width and amplitude of the impressed transient pulses.

Another object of my invention is to provide an externally blocked oscillator which performs the functions of equalizing and averaging the pulses impressed thereon.

Another object of my invention is to provide an externally blocked oscillator for the measurement of radioactivity which will serve as a radio transmitter for broadcasting the intensity of radioactive intensity at a remote point.

Still a further object of the invention is to provide a frequency meter of the general character indicated in which adjustments may be made for eliminating the background count of a Geiger-Mueller tube when used for measuring the particular radioactivity of specific rays or substances.

Yet a further object of my invention is to provide a frequency meter of the character indicated in which a differential count of radioactive intensity may be made when absorption measurements are taken.

Still a further object of this invention is to provide a frequency meter of the character described by which remote indications may be made and by which the control of remote equipment obtained.

Still another object of my invention is to provide a frequency meter of the character described having a long time constant circuit without the inclusion therein of integrating condensers.

Another object of my invention is to provide a frequency meter in which scale sensitivity may be changed by varying a single circuit component without requiring recalibration.

A further object of the invention is to provide a frequency measuring circuit providing sufficient current to operate a recording-type milliammeter.

Yet another object of the invention is to provide a rugged and compact pulse metering circuit of the character described which shall be relatively inexpensive to manufacture since it consists of few and simple parts; simple in its operation and positive in action; which shall have a large variety of applications; and yet be practical and efficient to a high degree in use.

Other objects of the invention will in part be obvious, and in part hereinafter pointed out.

My invention accordingly consists in the features of construction, and the combinations and arrangements of circuit elements which will be exemplified in the construction hereinafter described, and of which the scope of application will be indicated in the appended claims.

In the accompanying drawings forming a part of this specification in which several possible illustrative embodiments of this invention are shown, and wherein similar reference characters designate corresponding parts throughout the several views, Figure 1 is a wiring schematic of a frequency meter embodying the invention.

Figures 4 and 5 are wiring schematics embodying my invention wherein balancing-type voltmeters are used, while Figure 6 is a wiring schematic of a radio transmitter embodying the invention.

Figure 2:
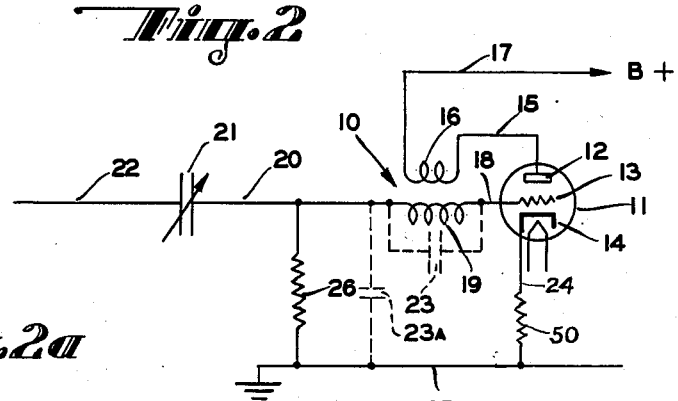
Figure 2 is a wiring schematic of the blocking oscillator circuit of the frequency meter.

Referring now in detail to Figure 2 of the drawings, 10 designates an oscillator embodying the invention. The oscillator comprises a triode 11 having a plate 12, a control grid 13, and an indirectly heated cathode 14. The triode plate 12 is connected by lead 15 to one end of a feedback coil 16, the other end of which is connected to B+ of the power supply through a lead 17. The grid 13 is connected by lead 18 to one side of an oscillating coil 19 which is in inductive relationship with feedback coil 16. The other end of coil 19 is connected by lead 20 to one side of a variable condenser 21, the other side of the condenser being connected to lead 22 which serves as one of the input terminals of the oscillator. Connected in parallel with the coil 19 is a condenser 23, which may be the distributed capacity of the coil. The cathode 14 is connected by lead 24 and resistor 50 to the grounded lead 25. A resistor 26 is connected at one end to lead 20 and at the other end to the grounded lead 25.

Connection of the B supply to the plate 12 of the triode through the feedback coil 16, will induce E. M. F. in the oscillating coil 19 and place a charge on the grid 13. Oscillations will start building up until an equilibrium condition is reached. The amplitude of oscillations will be limited by the value of the resistor 26 and the capacity of condenser 23A, condenser 23A being indicated in dash lines and is indicative of the capacity existing between the circuit elements 19, 18, and 23, and ground (cathode 14 and leads 24, 25).

When oscillations begin, the grid 13, is driven positive during a portion of the cycle causing electrons to flow from the cathode 14 to the grid. Since these excess electrons cannot return to the cathode during the remainder of the cycle, they can only leak off the condenser 23A through the resistor 26. The voltage drop across the resistor will make the grid negative with respect to the cathode, supplying the bias for tube 11. As the oscillations increase in amplitude, the grid 13 will become more positive, increasing the average grid current. Since the capacity of condenser 23A is extremely small, the time constant of resistor 26 and condenser 23A is also small. As a result, the grid 13 will not be driven negative to a point where cut-off occurs. The bias will be built up with the increase in oscillation amplitude until the transconductance of the tube falls to a value where equilibrium is established. Self-regulation for any given plate voltage is thus attained, the grid bias being very nearly equal to the alternating grid voltage. This explanation is general and applies to the automatic grid-bias operation of feedback oscillators having a grid leak and condenser in the grid circuit.

When a positive pulse is applied to the point 22 of the oscillator circuit, the low impedance path to ground through coil 19, grid 13, cathode 14 and cathode resistor 50 will maintain the grid at substantially constant value. A slight increase in voltage of grid 13 will not affect the operation of the oscillator beyond an increase in amplitude such as indicated at $a$ in Fig. 2b, because by such an increase in grid voltage the transconductance of the tube will be increased causing a rise in the average cathode voltage thus maintaining the grid bias, that is, the relative voltage between cathode 14 and grid 13 substantially constant. Accordingly while the voltage of lead 22 rises in a positive direction the voltage of lead 20 remains substantially constant. When the positive pulse suddenly decays, however, point 20 and grid 13 will be driven negative by a corresponding amount thereby cutting off conduction of tube 11 and interrupt the oscillations in the oscillator circuit. When tube 11 is cut off the low impedance path to ground through grid 13 and cathode 14 is interrupted and the only path through which capacitor 20 may regain equilibrium is through high impedance grid leak resistor 26. It should be noted that the width of the pulse has no bearing on the time the oscillator is interrupted because it is the trailing edge of the pulse which drives the grid beyond cut-off.

By actual experiments it has been found that variations in pulse amplitude have little, if any, effect on the blocking time of the oscillator, a variation of the pulse height of 300% causing less than 5% variation in blocking time. It should be obvious to those skilled in the art that if variations in pulse height introduced errors in the system, the pulses could be equalized or "clipped" by a limiting amplifier stage in the input to the oscillator. This has been found not to be necessary, however, the oscillator acting in some manner to equalize the incoming pulses, the exact theory of which is not clearly understood. For pulses on lead 22 in excess of 40 volts the following circuit constants for the input of the oscillator have been formed to give satisfactory operation:

C21—200 mmfd.
R26—500K
L19 and L16—30MH

These values are not critical, however, and may be varied over a wide range to obtain the particular desired operating characteristics of the circuit.

Examination of the grid circuit by connecting to the deflection plates of an oscilloscope at 20 and 25 shows the foregoing explanation to be substantially correct. On the oscilloscope also to be seen is the discharge curve of condenser 21, which curve does not appear at the plate 12 or at the cathode 14.

A resistor, such as 50, placed in the cathode circuit or in the plate circuit lead 17 of the tube 11 will have impressed across it a constant amplitude RF wave train with interruptions of constant duration; the number of interruptions corresponding to the number of pulses received.

Figure 2A:
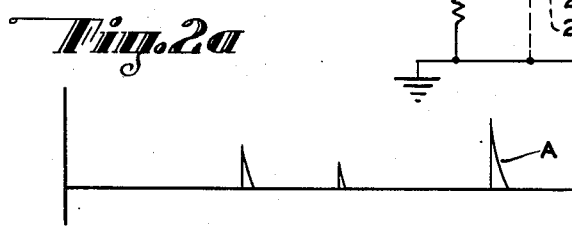
Figure 2A is a graph showing the amplitude and width of incoming pulses.
Figure 2B:
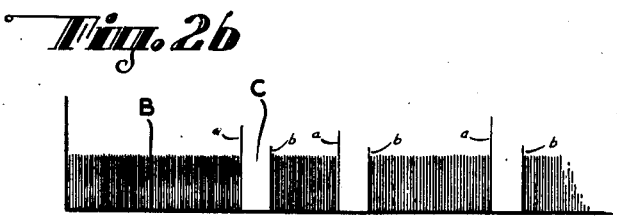
Figure 2B is a graph showing the constant amplitude wave train of the oscillator with interruptions of constant duration due to the incoming pulses.

In Figures 2A and 2B are shown the graphs of incoming pulses A of varying amplitude and width (time) and the resultant interrupted wave train B having uniform interrupted periods C due to the incoming pulses. The surges $a$ present as oscillations cease result from the increasing grid voltage due to the incoming pulse amplitude. The surges $b$ at the beginning of the oscillation train result from the changes in the transconductance of the tube in the process of self-regulation, the transconductance rising prior to falling to the equillibrium value.

A negative pulse applied to lead 22 will drive the tube to cut-off whereby the oscillations are blocked for a period depending on the width of the pulse in which case proper calibration of the integrating circuit will give an approximation of the number of pulses present. The oscillator is thus responsive to negative or positive voltages and will operate on periodic or aperiodic pulses, sine-wave or square-wave input voltages.

The time constant of the circuit may be varied by varying the capacity of condenser 21. When the RC time constants permit counts of 200 cps., halving the capacity of condenser 21 will permit counts of 400 cps., and 2,000 cps. when the capacity is one-tenth the original value.

Figure 1:
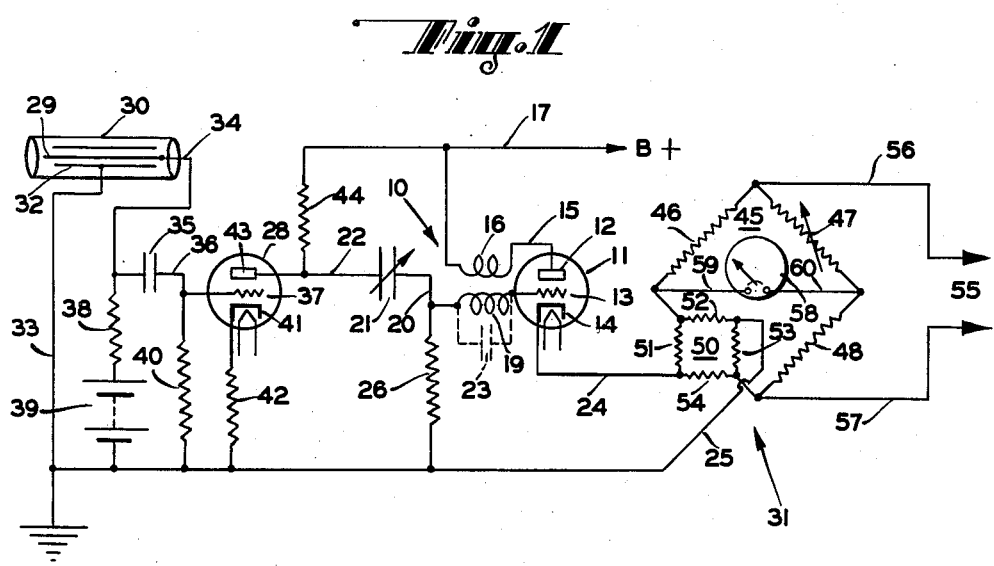

Referring now to Figure 1 of the drawings, the input of the externally blocked oscillator 10 is shown connected to the output of an amplifying stage 28, the input thereof being connected to the anode 29 of a self-quenching Geiger-Mueller tube 30; while a time delay circuit 31 is connected into a cathode circuit of the oscillator.

The cathode 32 of the Geiger-Mueller tube 30 is connected by lead 33 to the grounded lead 25. The anode 29 is connected by a lead 34 to one side of a blocking condenser 35, the other side of the condenser being connected by lead 36 to the grid 37 of tube 28. The anode 29 is further connected by the lead 34 through a current-limiting resistor 38 to a positive high voltage supply 39. The lead 36 is connected to the grounded lead 25 through a resistor 40.

The tube 28 is provided with an indirectly heated cathode 41 connected through a bias resistor 42 to the grounded lead 25. The plate 43 of the tube is connected to lead 22 and through a resistor 44 to the B supply lead 17. The tube may be operated near its saturation point to limit or "clip" the pulses applied to the oscillator.

Ionization of the Geiger-Mueller tube 30, shown here as the self-quenching type, causes a momentary flow of current resulting in a potential decrease of condenser 35 and a negative pulse at grid 37. The plate current of tube 28 will thus be decreased for the duration of the pulse from the Geiger-Mueller tube 30. The IR drop across the resistor 44 provides a positive charge on lead 22 which will block the oscillator 10 in the manner described.

The oscillator 10 may be operated without the intervening amplifying stage 28 provided the input voltage is sufficient to drive the tube to cut-off.

Means is now provided to count the impulses delivered by the Geiger-Mueller tube.

To this end there is provided an integrating or averaging circuit 31 comprising a Wheatstone bridge arrangement 45 of three resistors 46, 47, and 48. The fourth arm of the bridge comprises a control bridge 50 having four equal temperature responsive resistors 51, 52, 53, and 54 sealed in an evacuated envelope (not shown). Power is supplied from an external source 55 through the leads 56 and 57 to opposite ends of the bridge 45. The voltage supplied by the power supply 55 may be either D.-C. or A.-C. of any frequency. The opposite corners of the control bridge 50 are connected into the cathode circuit of the oscillator 11 by the leads 24 and 25. The unbalance of the bridge 45 is indicated by a meter 58 connected to the opposite corners of said bridge by the leads 59 and 60. The meter 58 may either be a D'Arsonval movement or a vacuum tube voltmeter.

The resistance of the four arms of the bridge 45 are equal. The voltage supplied to the bridge from source 55 will be balanced in the network with the result that no current will flow through the meter 58. A voltage applied to the control bridge 50 through the leads 24 and 25 will be balanced therein. Since the four arms are of equal resistance values, no current will flow from the control bridge circuit into the main bridge. The current flowing in the arms of bridge 50 will be manifested by a rise in temperature of the resistors due to the $I^2R$ losses therein. The resistors 51, 52, 53, and 54 having a temperature coefficient of resistance, will, due to the heating thereof, cause a change in the effective resistance of the control bridge. The resistance of one arm of the main bridge is thus varied, causing an unbalance of the main bridge, the unbalance being indicated by the meter 58.

For a further description of the integrating or averaging circuit 31 herein described, reference may be made to my copending application for a Control System, bearing Serial No. 648,490 filed on February 18, 1946.

The constant-amplitude wave train with interruptions of constant duration in the cathode circuit is impressed across the control bridge 50, the potentials across the resistors 51, 52, 53, and 54 cancelling each other where they join the arms of the main bridge 45. The bridge voltage 55 also balances out at the oscillator connection points to the control bridge 50 so that the bridge voltage is not superimposed on the oscillator voltage. The temperature changes due to the energy stored in the control bridge by the oscillator circuit, will vary the resistance of the bridge 50 to unbalance the bridge 45. The reading of the meter 58 will indicate the unbalance of the bridge 45. Since the energy supplied to the control bridge 50 is proportional to the energy remaining in the interrupted wave train supplied by the oscillator, which in turn is dependent on the number of pulses delivered by the Geiger-Mueller tube 30, it follows that a reading of meter 58 will indicate the average frequency or pulse rate.

The resistance arm 47 of bridge 45 may be made variable for adjustment of the balanced condition of the circuit whereby the background counts may be eliminated, or the bridge unbalance by the control bridge so made that either an "up scale" or "down scale" reading may be obtained on the meter 58. The circuit may also be adjusted to obtain meter deflection left or right from a mid position zero point on the scale.

While I have disclosed the integrating circuit as being connected into the cathode circuit of the oscillator for the reason that the voltage in the cathode circuit is virtually independent of input voltage, the integrating circuit may readily be connected into the plate circuit of the oscillator 11.

Figure 3:
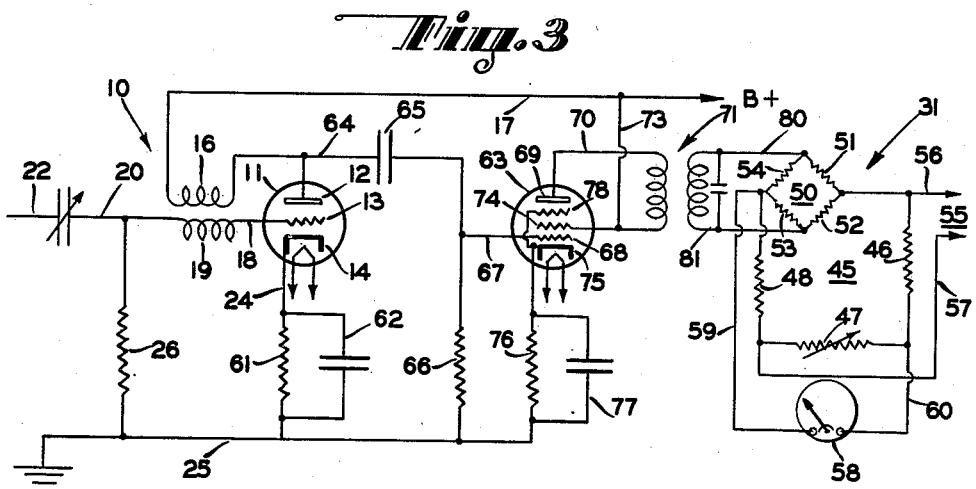
Figure 3 is a wiring schematic of a frequency meter embodying the invention wherein the integrating circuit is connected to the plate circuit of an amplifier tube.

In Figure 3 of the drawings, I have indicated the integrating circuit connected to the plate circuit of an amplifier tube resistance coupled to the oscillator.

The cathode lead 24 of the tube 11 is now connected through a bias resistor 61 to the grounded lead 25, a by-pass condenser 62 being connected in parallel with said resistor. The oscillator is resistance coupled to a pentode 63; the plate being connected by lead 64 through a coupling condenser 65 and resistance 66 to grounded lead 25, and by lead 67 to control grid 68 of the pentode. The plate 69 of the pentode is connected by lead 70 through the primary of an air core transformer 71 to the screen grid 74, and by lead 73 to the B supply lead 17. The suppressor grid 78 is shown internally connected to the cathode 75 in the usual manner, the cathode being connected through a bias resistor 76 and a shunted by-pass condenser 77 to the grounded lead 25.

The secondary winding of the transformer 71 is connected by the leads 80 and 81 to the control bridge 50 of the integrating circuit 31. A condenser may be connected across the secondary to provide maximum energy transfer. The pulse interrupted, constant-amplitude plate voltage of the oscillator is thus amplified and applied to the control bridge 50. The energy delivered will cause a change in the resistance of control arm of the bridge 45 to indicate the number of pulses delivered by the Geiger-Mueller tube 30.

Figure 4:
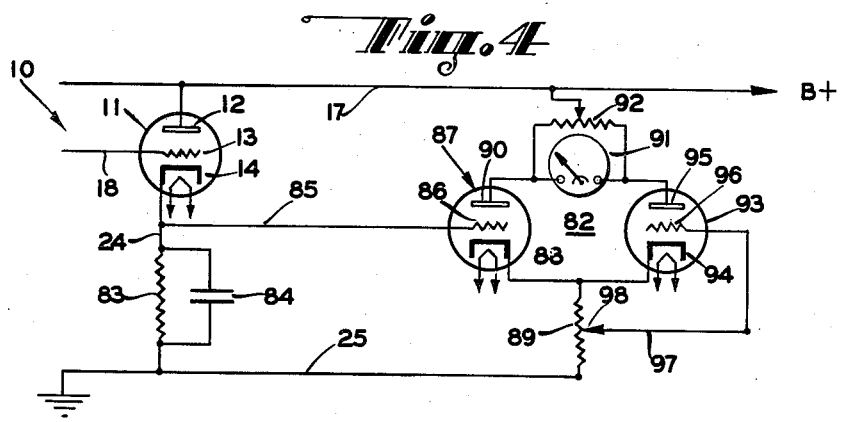

Another method for integrating or averaging the pulses delivered by the Geiger-Mueller tube, is illustrated in Figure 4 where I have shown my externally blocked oscillator connected to a balancing type voltmeter 82.

The cathode 14 of the oscillator is connected by the lead 24 through a resistor 83 to the grounded lead 25, the resistor having a condenser 84 in shunt therewith. The cathode lead 24 is a further connected by a lead 85 to the grid 86 of a tube 87 of the voltmeter 82. The cathode 88 of the tube 87 is connected through a potentiometer 89 to the grounded lead 25, while the plate 90 thereof is connected to one terminal of a meter 91 and through a potentiometer 92 to the B supply lead 17. A second tube 93 is provided for the vacuum-tube voltmeter 82, the cathode 94 of which is connected through the potentiometer 89 to the grounded lead 25. The plate 95 of the tube 93 is connected to the other terminal of the meter 91, and through the potentiometer 92 to the B supply lead 17. The grid 96 of said tube is connected by a lead 97 to a slide wire connection 98 of the potentiometer 89.

Prior to use, the circuit of the vacuum-tube voltmeter 82 is adjusted so that the desired type of readings may be obtained. When an "up scale" reading or a "down scale" reading is desired, the slide wire 98 is moved along the potentiometer 89 to a point where the difference in plate currents as delivered by the two tubes 87 and 93 will give a zero reading or a desired reference reading at the "down end" or "up end" of the scale, as the case may be. Further adjustments may be made for balancing the currents of plates 90 and 95 or for the elimination of background counts by adjusting the plate voltages applied to both sections of the meter by varying the potentiometer 92 connected into the plate circuits of said tubes.

The "integration" or averaging of the square pulse wave train of the oscillator is done in the cathode circuit thereof. The condenser 84 of the cathode circuit is relatively large, being about 1000 mfd. or more; while the resistor 83 is of a relatively small value. The voltage drop across the resistor 83 due to the charging and discharge of condenser 84 is impressed on the input circuits of tubes 87 and 93. The voltage impressed is in proportion to the average rate of random pulses delivered by the Geiger-Mueller tube.

While I have indicated that a small resistor and a large condenser is used in the cathode circuit of the oscillator, it will be evident to those skilled in the art that a small condenser may be used in the cathode circuit and a large condenser (not shown) connected into the plate circuits of the tubes 87 and 93 in parallel with the meter 91. The averaging or "integrating" of the pulses will then take place in the meter circuit of the vacuum-tube voltmeter.

Figure 5:
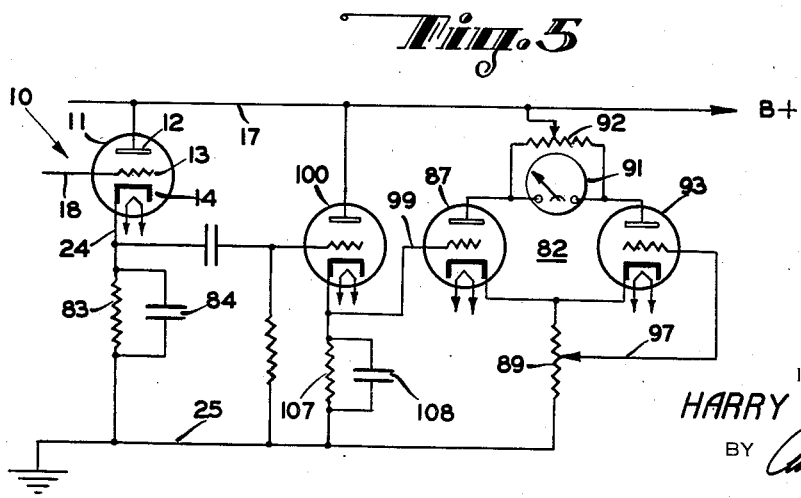

Another method for averaging or integrating the pulses as delivered by the Geiger-Mueller tube is indicated in Figure 5 where I have shown the balancing-type voltmeter 82 connected into the cathode circuit of an isolating or buffer stage 100 which acts also as a rectifier, giving positive pulses to the grid of tube 87. The buffer stage is resistance-coupled to the cathode circuit of the oscillator. The cathode resistance 107 and its shunted condenser 108 integrate or average the pulses of the Geiger-Mueller tube, the buffer stage 100 preventing interaction between the oscillator and the integrating circuit.

I have found that for a differential reading of pulse rates of less than 3 to 1 ratio for full scale deflections, sufficient current is obtained from meter 91 to operate a 5 milliammeter.

A relay or a differential relay may be substituted for the meter which is responsive to a predetermined rate. Operation of the relay would operate a warning device or could shut off remotely positioned equipment.

In Figure 6 I have illustrated the externally blocked RF oscillator 11 as forming a part of a radio transmitter in radiosonde equipment. The oscillator 10 is coupled to an amplifier stage 101 through a condenser 102 and a resistor 103. The output of the amplifier stage 101 is coupled to an antenna 104 through a transformer 105, a condenser 106 in the output circuit being provided for tuning. Filament types tubes may be used and all bias resistors and bias condensers eliminated. A receiver located at a ground station equipped with a frequency meter of the type described and/or recorder will indicate the radioactive particle bombardment detected by the Geiger-Mueller tube.

It will thus be seen that there is provided a device in which the several objects of this invention are achieved and which is well adapted to meet the conditions of practical use.

As various possible embodiments may be made of the above invention, and as various changes might be made in the embodiments above set forth, it is to be understood that all matter set forth herein, or shown in the accompanying drawings, is to be interpreted as illustrative and not in a limiting sense.

Having thus described my invention, I claim as new and desire to secure by Letters Patent:

1. The method of measuring the average frequency of random electrical impulses derived from radioactive particle bombardment comprising the steps of blocking a freely running oscillator by said electrical impulses and thus deriving the average frequency of said impulses by applying the constant-amplitude wave train having interruptions of constant duration resulting from the blocking of the oscillator to an integrating device for integrating said wave train.

2. The method of measuring the average intensity of radio-active particle bombardment comprising the steps of deriving random electrical impulses for the radioactive particles of the bombardment, inverting the impulses to positive polarity, then blocking a freely running oscillator with the positive pulses, and deriving the number of atomic particles during the bombardment by applying the constant-amplitude wave train having interruptions therein resulting from the blocking of the oscillator to an integrating device.

3. The method of measuring the average frequency of random pulses persisting for a relatively short time in comparison to the rate at which the pulses occur, said method comprising the steps of blocking a freely running oscillator by the pulses to be measured, deriving the average number of pulses per unit of time by applying the constant-amplitude wave train of the oscillator having interruptions therein resulting from the blocking of the oscillator to an integrating circuit for integrating said wave train, and measuring the integrated wave train to determine the average frequency of the pulses.

4. A frequency meter for measuring average frequency of random pulses comprising, a freely running oscillator, a control circuit for said oscillator including a network having a predetermined time constant for interrupting said oscillator for a period dependent upon said time constant when a pulse is applied to said network, and integrating circuit means for integrating the interrupted wave train of said oscillator resulting from the blocking thereof to produce an average measure of the number of pulses applied to said network per unit of time.

5. A device for determining the average intensity of radioactive particle bombardment comprising in combination with a Geiger-Mueller tube adapted to deliver electrical impulses of relatively narrow width for the radio-active particles impinging thereon, of a freely running oscillator, and a grid circuit for said oscillator having a resistor and a condenser therein, the time constant of said resistance-capacitance network being greater than the width of the impulses delivered by said Geiger-Mueller tube, and means for impressing the electrical impulses on said grid circuit to drive the grid of the oscillator negative and block the oscillations to provide constant-width interruptions of the constant-amplitude wave train of said oscillator.

6. A device for determining the average intensity of radioactive particle bombardment comprising in combination with a Geiger-Mueller tube adapted to deliver electrical impulses for the radioactive particles impinging thereon, of a freely running oscillator, a grid circuit for said oscillator having a resistor and a condenser therein, the time constant of said resistance-capacitance being greater than the width of the impulses delivered by said Geiger-Mueller tube, means for impressing the electrical impulses on said grid circuit to drive the circuit of the oscillator negative and block the oscillations to provide constant-width interruptions of the constant-amplitude wave train of said oscillator, an impedance connected into the output circuit of said oscillator, and means connected to said impedance for integrating the interrupted wave train of said oscillator.

7. A device for determining the average intensity of radioactive particle bombardment, comprising in combination with a Geiger-Mueller tube adapted to deliver electrical impulses of relatively narrow width for the radioactive particles impinging thereon, of a freely running oscillator, a grid circuit for said oscillator having a resistor and a condenser therein, the time constant of said resistance-capacitance being greater than the width of the impulses delivered by said Geiger-Mueller tube, means for impressing electrical impulses on said grid circuit to charge the condenser and drive the grid negative to block the oscillations and provide constant width interruptions of the constant-amplitude wave train of said oscillator, an impedance connected into the output circuit of said oscillator, and means connected to said impedance for integrating the interrupted wave train of said oscillator, said impedance comprising a bridge network having equal temperature responsive resistances therein, said integrating means comprising a second bridge network including said first bridge network as one of the arms thereof, and a meter connected across said second bridge network for indicating the condition of unbalance of said network.

8. A device for determining the average intensity of radioactive particle bombardment, comprising in combination with a Geiger-Mueller tube adapted to deliver electrical impulses for the radioactive particles impinging thereon, of a freely running oscillator, a grid circuit for said oscillator having a resistor and a condenser therein, the time constant of said resistance-capacitance network being greater than the width of the impulses delivered by said Geiger-Mueller tube, means for impressing the electrical impulses on said grid circuit to charge said condenser and drive the grid negative for blocking oscillations and provide constant-width interruptions of the constant-amplitude wave train of said oscillator, an integrating circuit connected to said oscillator for integrating said wave train, and a meter connected to said integrating circuit for determining the particle bombardment intensity.

9. A device for determining the average intensity of radioactive particle bombardment, comprising in combination with a Geiger-Mueller tube adapted to deliver electrical impulses of relatively narrow width for the radioactive particles impinging thereon, of a freely running oscillator, a grid circuit for said oscillator having a resistance capacitance network therein, the time constant of said network being greater than the width of the impulses delivered by said Geiger-Mueller tube, means to impress the electrical impulses on said grid circuit and block said oscillator to provide constant-width interruptions of the constant-amplitude wave train of said oscillator, an integrating circuit connected to said oscillator for integrating said wave train, and a meter connected to said integrating circuit for determining the particle bombardment intensity, said integrating circuit comprising a resistor and condenser in parallel, said meter comprising a vacuum tube voltmeter for measuring the voltage drop across said resistor due to the interrupted wave train of said oscillator.

10. A device for determining the average intensity of radioactive particle bombardment, comprising in combination with a Geiger-Mueller tube adapted to deliver electrical impulses for the radioactive particles impinging thereon, of a freely running oscillator, a grid circuit for said oscillator having a resistor and a condenser therein, the time constant of said resistance-capacitance network being greater than the width of the impulses delivered by said Geiger-Mueller tube, means to impress the electrical impulses on said grid circuit to charge said condenser and drive the grid negative to block oscillations and provide constant-width interruptions of the constant-amplitude wave train of said oscillator, an integrating circuit connected to said oscillator for integrating said wave train to determine the particle bombardment intensity, and a meter connected to said integrating circuit for indicating the intensity of particle bombardment, said integrating circuit comprising a bridge network, a second bridge network having equal temperature responsive resistances forming one arm of the first said bridge network, said meter reading the unbalance of said first bridge network due to the changes in resistance of the temperature responsive bridge.

11. A device for determining the average intensity of radioactive particle bombardment, comprising in combination with a Geiger-Mueller tube adapted to deliver electrical impulses of relative narrow width for the radioactive particles impinging thereon, of a freely running radio frequency oscillator, a grid circuit for said oscillator having a resistor and a condenser therein, the time constant of said resistance-capacitance being greater than the width of the impulses delivered by said Geiger-Mueller tube, means for impressing the electrical impulses on said grid circuit to charge said condenser and drive the grid negative to block the oscillations and provide constant-width interruptions of the constant-amplitude radio frequency wave train of said oscillator, and means for applying the energy of said oscillator to an integrating circuit to determine the intensity of particle bombardment.

12. A device for determining the average intensity of radioactive particle bombardment, comprising in combination with a Geiger-Mueller tube adapted to deliver electrical impulses for the radioactive particles impinging thereon, of a freely running radio frequency oscillator, a grid circuit for said oscillator having a resistor and a condenser therein, the time constant of said resistance-capacitance being greater than the width of the impulses delivered by said Geiger-Mueller tube, means for impressing the electrical impulses on said grid circuit to charge said condenser and drive the grid negative for blocking the oscillations and provide constant-width interruptions of the constant-amplitude radio frequency wave train of said oscillator, and means for transmitting the interrupted constant-amplitude wave train of said oscillator.

13. A meter for measuring average frequency of random pulses comprising, a freely running oscillator normally producing a constant amplitude wave train, a grid circuit for said oscillator having a resistance and capacity network with a predetermined time constant, means for impressing a random pulse on said grid circuit to charge the condenser of said network and drive the grid negative to block oscillations for a period determined by said time constant, means for integrating the interrupted constant amplitude wave train of said oscillator, and a meter connected to said integrating means for measuring the integrated wave train and indicating the average frequency of the pulses.

14. A meter for measuring the average frequency of random pulses of relatively narrow width comprising, a freely running oscillator, a grid circuit for said oscillator having a resistance-capacitance network with a time constant greater than that of the average width of the pulses, means for impressing a random pulse on said grid circuit to charge the condenser of said network and drive the grid negative to block oscillations for a period determined by said time constant, a circuit having a time constant for integrating the wave train of said oscillator, and a meter connected to said integrating circuit for measuring the integrated wave train and indicating the average frequency of the pulses.

15. A meter for measuring average frequency of random pulses comprising, a freely running oscillator having an input with a control grid, a first parallel resistance-capacitance network in the control grid circuit of said oscillator for regulating the amplitude of the oscillations, a condenser in the input of said oscillator and coupled to the resistance of said network and forming with said resistance a second resistance-capacitance network having a larger time constant than said first network, means for impressing a random pulse on the input to charge said condenser and drive the grid negative to block said oscillator for a period determined by the time constant of said second network and provide an interrupted constant amplitude wave train, means for integrating the interrupted constant amplitude wave train of said oscillator, and a meter connected to said integrating means for measuring the integrated wave train and indicating the average frequency of the pulses.

HARRY CONVISER.

REFERENCES CITED

The following references are of record in the file of this patent:

UNITED STATES PATENTS

| Number | Name | Date |
|---|---|---|
| 767,971 | Stone | Aug. 16, 1904 |
| 1,590,420 | Chubb | June 29, 1926 |
| 1,672,215 | Heising | June 5, 1928 |
| 2,125,732 | Bowman-Manifold et al. | Aug. 2, 1938 |
| 2,320,175 | Dennis et al. | May 25, 1943 |
| 2,321,295 | Howell | June 8, 1943 |
| 2,325,927 | Wilbur | Aug. 3, 1943 |
| 2,355,606 | Shannon | Aug. 15, 1944 |
| 2,366,076 | Wilbur | Dec. 26, 1944 |
| 2,369,550 | Frosch | Feb. 13, 1945 |
| 2,409,577 | Matson, Jr. | Oct. 15, 1946 |
| 2,419,292 | Shepard, Jr. | Apr. 22, 1947 |
| 2,434,297 | Test et al. | Jan. 13, 1948 |
| 2,389,991 | Mayle | Nov. 27, 1948 |
| 2,456,016 | Owen | Dec. 14, 1948 |
| 2,480,385 | Sebring | Aug. 30, 1949 |

FOREIGN PATENTS

| Number | Country | Date |
|---|---|---|
| 204,121 | Germany | Nov. 4, 1908 |
| 477,392 | Great Britain | Dec. 22, 1937 |

OTHER REFERENCES

Review of Scient. Inst., Vol. 7, Dec. 1936, "A Direct-Reading Counting Rate Meter for Random Pulses," by Gingrich et al., pgs. 450–456.

Bacon (Publ.), R. F. Power Measurement, by W. Bacon, Electronic Engineering, Jan. 1943, pgs. 344–345.